(12) United States Patent
Wachowicz et al.

(10) Patent No.: US 6,476,172 B1
(45) Date of Patent: Nov. 5, 2002

(54) METALLOCENE CATALYZED PROPYLENE-α-OLEFIN RANDOM COPOLYMER MELT SPUN FIBERS

(75) Inventors: Darek Wachowicz, Pasadena, TX (US); Cyril Chevillard, Dickinson, TX (US); Lisa K. Albe, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/916,476

(22) Filed: Jul. 27, 2001

(51) Int. Cl.⁷ .......................... C08F 210/06; D02G 3/02
(52) U.S. Cl. .................. 526/348.1; 526/250; 526/339; 526/345; 526/347; 528/502 B; 428/364; 264/210.8; 264/290.5; 264/291; 264/331.15
(58) Field of Search ................ 526/348.1, 250, 526/339, 345, 347; 428/364, 394; 264/210.8, 290.5, 291, 331.15; 528/502 B

(56) References Cited

U.S. PATENT DOCUMENTS 5,763,080 A * 6/1998 Stahl et al. ................ 428/378
5,993,964 A * 11/1999 Nakajima ................ 526/348 X
6,342,565 B1 * 1/2002 Cheng et al. ................ 525/191

OTHER PUBLICATIONS

Hackh's Chemical Dictionary, 4th ed., McGraw–Hill, N.Y., p. 472 (1969).*

* cited by examiner

Primary Examiner—Fred Teskin
(74) Attorney, Agent, or Firm—The Matthews Firm; Bradley A. Misley

(57) ABSTRACT

A fiber product drawn from an isotactic propylene copolymer of a $C_2$, $C_4$, $C_5$, $C_6$, $C_7$ or $C_8$ α-olefin monomer produced in the presence of a metallocene catalyst characterized by a bridged chiral and stereorigid cyclopentadienyl or substituted cyclopentadienyl ligand structure of a transitional metal selected from group 4b, 5b, or 6b metals of the Periodic Table of Elements, the copolymer having a MFR less than 35, suitably about 30 or less. The copolymer is heated to a molten state and extruded to form a fiber preform. The preform is subjected to spinning at a spinning speed of at least 300 meters per minutes and subsequent drawing at a speed of up to about 1500 meters per minute to provide a draw ratio of at least 1.5 up to 5:1 to produce a continuous fiber having high tenacity of about 3.5 grams per denier and greater and good hand.

36 Claims, 3 Drawing Sheets

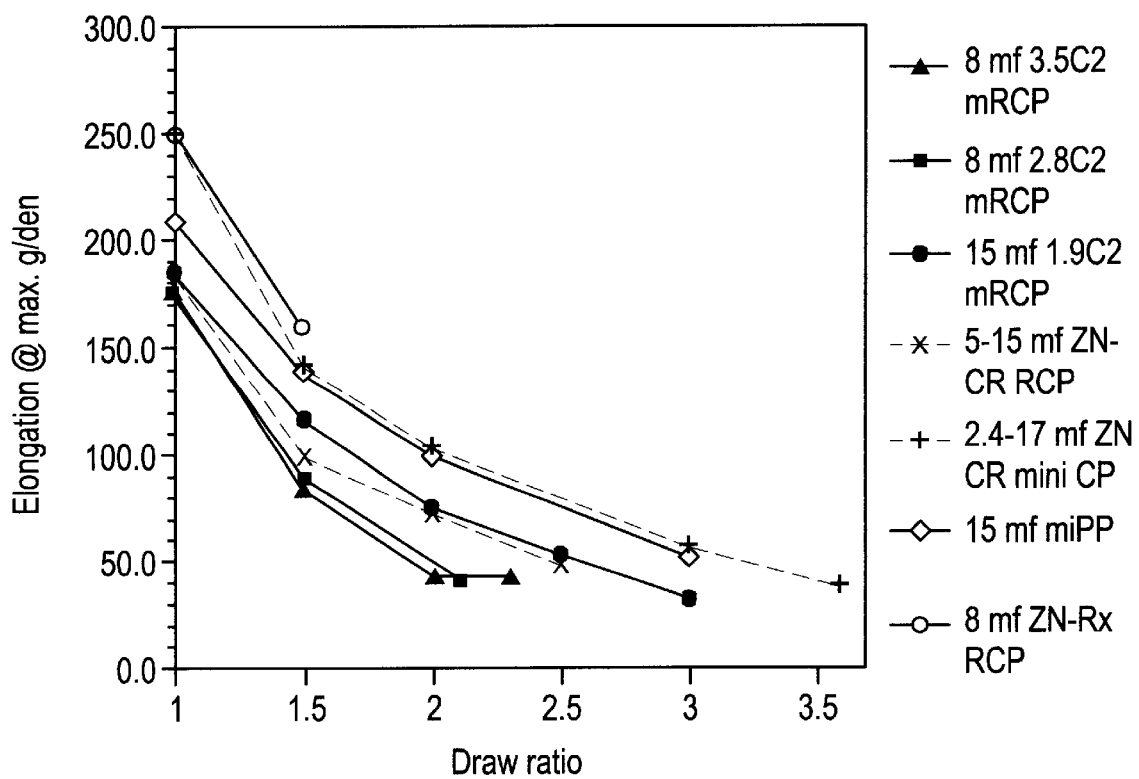

METALLOCENE CATALYZED PROPYLENE-α-OLEFIN RANDOM COPOLYMER MELT SPUN FIBERS

FIELD OF THE INVENTION

This invention relates to α-olefin random copolymer fibers and, more particularly, to such fibers and processes for their preparation from propylene α-olefin random copolymers manufactured using a metallocene catalyst.

BACKGROUND OF THE INVENTION

Thermoplastic olefin polymers, such as linear polyethylene, polypropylene, and olefin copolymers, such as propylene-ethylene copolymers, are conveniently formed in continuous loop-type polymerization reactors and thermo-formed to arrive at granules or pellets of the polymers. For example, polypropylene and propylene-ethylene copolymers are polymerized in continuous polymerization reactors in which the monomer stream is introduced into a reactor and circulated with an appropriate catalyst to produce the olefin homopolymer or copolymer. The polymer is withdrawn from the catalyst reactor and subjected to appropriate processing steps and then extruded as a thermoplastic mass through an extruder and die mechanism to produce the polymer as a raw material in particulate form, usually as pellets or granules. The polymer particles are ultimately heated and processed in the formation of the desired end products.

Polypropylene and propylene copolymers, as used in various applications involving production of films, fibers, and similar products, are thermo-processed and shaped or oriented by uni-directional or bi-directional stresses. Such polymers are thermoplastic crystalline polymers. Isotactic polypropylene is conventionally used in the production of fibers in which the polypropylene is heated and then extruded through one or more dies to produce a fiber preform which is processed by a spinning and drawing operation to produce the desired fiber product.

Isotactic poly-α-olefins traditionally have been catalyzed by well-known multi-site catalysts including Ziegler-Natta type catalysts such as titanium chloride. While such catalysts are useful for producing resins or polymers of α-olefins, including polypropylene and propylene-ethylene random copolymers, they produce polymers with relatively broad molecular weight distributions or polydispersity which include significant fractions of polymer material with both higher and lower molecular weight than the average or nominal molecular weight of the polyolefin polymer. For example, U.S. Pat. No. 4,298,718 to Mayr et al., U.S. Pat. No. 4,560,735 to Fujishita and U.S. Pat. No. 5,318,734 to Kozulla disclose the formation of fibers by heating, extruding, melt spinning, and drawing from polypropylene produced by titanium tetrachloride-based isotactic polypropylene. Particularly, as disclosed in the patent to Kozulla, the preferred isotactic polypropylene for use in forming such fibers has a relatively broad molecular weight distribution ("MWD"), as determined by the ratio of the weight average molecular weight ("$M_w$") to the number average molecular weight ("$M_n$") of about 5.5 or above. Preferably, as disclosed in the Kozulla patent, the molecular weight distribution, $M_w/M_n$, is at least 7.

The high molecular weight fraction found in such Ziegler-Natta reactor-grade isotactic polymers causes processing difficulties for the maker of polypropylene fibrous or fiber-containing products. As explained in U.S. Pat. No. 6,010,588, the high molecular weight fraction contributes significantly to the melt strength of the molten polymer, diminishing the processability of the polymer. Some of the processing problems involve the need for higher processing temperatures necessary to reduce the inherent melt strength and viscosity and cause the higher molecular weight chains to move. This requires higher energy input to move the polymer through the extruder or other processing equipment. High melt strength also leads to difficulty in forcing the molten resin through a small fiber-forming orifice. Within that restriction, the high molecular weight molecules cause significant drag and diminish flow. Those same molecules also cause significant die swelling of the polymer fibril upon its exit from the fiber-forming orifice due to their inherent tendency toward elastic response with recovery of their conformational bulk. Along with these processing difficulties for fiber manufacturers, the fibers resulting from traditionally produced polypropylene tend to be thick, due to the melt strength of the molten resin. Such fibers lead to formation of fairly coarse fabrics which lack "give", limiting their use in garments and other applications where a pleasant feel or "hand" is desirable.

One solution for reducing "boardiness" and increasing "softness" and "give" of fabrics made from polyolefin fiber has been copolymerization of ethylene with propylene to make random copolymers. Small amounts of ethylene monomer are added in a reacting medium comprising propylene and a Zeigler-Natta catalyst capable of randomly incorporating the ethylene monomer into the macromolecule chain, reducing overall crystallinity and rigidity of the macromolecule. Propylene-ethylene random copolymers, because of their lower crystallinity and rigidity, are preferred over homopolymer isotactic polypropylene in fiber and fabric applications that require enhanced softness.

However, like the Ziegler-Natta isotactic polypropylene polymers, the Ziegler-Natta propylene-ethylene random copolymers have fiber processing difficulties. Further, there has been inability of existing fiber and fabric processes to economically draw fine diameter fibers from conventional high ethylene content random copolymers, in particular random copolymers having an ethylene content greater than about 3% by weight. In addition, as explained in U.S. Pat. No. 5,994,482, random copolyers having an ethylene content greater than about 5% by weight generally have not been feasibly produced in liquid reactor or hybrid reactor technologies. Liquid and hybrid reactor systems account for the most part of polypropylene manufacturing capacity worldwide. In a liquid reactor system, the liquid hydrocarbon solubilizes the atactic portion of the polymer, the level of which is enhanced by the high incidence of ethylene monomer in the polymer chain. The atactic material is tacky and creates flowability problems in the downstream equipment as soon as the liquid hydrocarbon is vaporized. Above an ethylene content of about 5% by weight, tacky copolymer granules agglomerate and/or stick to the metal walls of the process equipment.

The processing difficulties described above respecting Zeigler-Natta polymers and copolymers led to development of post-reactor treatment of Ziegler-Natta polymers to enhance processability. Most of these post-formation or post-reactor processes involve some sort of molecular chain scission of the polymer molecules, normally accomplished through the treatment of polyolefins, particularly, polypropylene, with heat and oxygen, or a source of free radicals such as organic peroxides. When organic peroxides are mixed with polypropylene in the melt phase, the polymer is caused to degrade to a narrower molecular weight distribution ("MWD") and lower average molecular weight ("$M_w$") and exhibits a higher melt flow rate ("MFR"). The $M_w$ of the visbroken polyolefin is determined by the MFX test (ASTM D1238, Condition L). MFR is a characteristic well known in the art and is reported as grams/10 minutes or dg/min, at 230° C. The $M_w$ of a visbroken polyolefin determines the level of melt viscosity and the ultimate desirable physical properties of the fiber. Basically, since a higher MFR flows more melted polymer through an orifice, a lower $M_w$ polymer is more easily melt spun. Most melt spinning is at MFR's exceeding 35 dg/min.

Degradation of polypropylene polymer to a lower average $M_w$ and a narrower MWD dan the starting material has been termed "visbreaking" the polyolefin. The presence of the organic peroxides in the polypropylene resin results in what is known as "controlled rheology" or "CR" resin. A peroxide of choice in the polypropylene art in the production of CR polypropylene resins is 2,5-dimethyl-2,5-bis(t-butylperoxy) hexane, available from ATOCHEM, Organic Peroxides Division, Buffalo, N.Y., as Lupersol 101. The post-reactor treatment involving oxidative scission offers several benefits for fiber makers, including reduced overall viscosity and improved flowability, with shifted molecular weight distribution, reduced nominal molecular weight, and significantly reduced fractions of high molecular weight species.

However, post reactor visbreaking of polypropylene and propylene-ethylene random copolymers is not without its drawbacks, for it also results in increases in the fraction of low molecular weight species in the polymer. The lower molecular weight species tend to become volatile during melt processing. This volatility causes difficulty such as an apparent smoking from the material at high temperature when it is not contained, as when it exits a spinning die. The volatility of the low molecular weight fraction also tends to lead to a blooming or surface imperfection on the finished fibers after they are drawn, due to the pitting and cracking which may be caused as the low molecular weight species volatilize. The visbreaking step adds to the expense of the production process. This not only increases costs but also complicates the process of polyolefin resin production for the polymer producer.

In light of the complications caused for both the polymer producer and the end user of the Ziegler-Natta polyolefin in making fiber, improvements in the manufacture of isotactic propylene as reactor-grade materials were sought, and have been made recently, using single site metallocene catalysts. These produce an isotactic polypropylene having a narrow molecular weight distribution that eliminates the problems associated with high melt strengths of the reactor grade Ziegler-Natta isotactic polyolefins, yet they can still have the nominal molecular weight of the post-reactor oxidatively degraded products.

For the convenience herein, various polymers are sometimes identified by abbreviations, as follows:

| | |
|---|---|
| "m" | stands for metallocene catalyzed; |
| "iPP" | means isotactic polypropylene; |
| "m-iPP" | thus means metallocene catalyzed isotactic polypropylene; |
| "ZN" | stands for Ziegler Natta catalyzed; |
| "Rx" | means reactor grade; |

-continued

| | |
|---|---|
| "Rx ZN-iPP" | thus signifies a reactor grade Ziegler-Natta catalyzed isotactic propylene; |
| "CR" | means controlled rheology; |
| "CR ZN-iPP" | thus indicates a controlled rheology Ziegler-Natta catalyzed isotactic propylene; |
| "iPE RCP" | means isotactic propylene-ethylene random copolymer; |
| "CR ZN-iPE RCP" | thus means a controlled rheology Ziegler-Natta catalyzed isotactic propylene-ethylene random copolymer. |
| "m-iPE RCP" | thus means a metallocene catalyzed isotactic propylene-ethylene random copolymer. |

Metallocene catalysts that produce m-iPP and m-iPE RCP are disclosed in U.S. Pat. Nos. 4,794,096, 4,975,403 and 6,117,957, incorporated herein by reference. These patents disclose chiral, stereorigid metallocene catalysts that polymerize olefins to form isotactic polymers and are especially useful in the polymerization of highly isotactic polypropylene.

Working to achieve fibers of high strength and softer hand exploiting the narrower molecular weight distributions and nominal molecular weighs of controlled rheology polymers afforded by metallocene catalysis, the art has employed high melt spinning draw speeds, in excess of 2000 m/min (meters per minute) and draw ratios of at least 3 in melt spinning equipment. For example, U.S. Pat. No. 6,010,588, describes the manufacture of m-iPP using rac-dimethylsilanediylbis (2-methyl-4,5-benzo-indenyl) zirconium dichloride with alumoxane as a supported metallocene catalyst. Fibers formed from an m-iPP polymer were prepared, according to U.S. Pat. No. 6,010,588, as spun partially oriented yarns by mechanical take-up of the fiber bundle from a 232° C. extruded melt, and were drawn from the melt by an axially spinning unheated godet at 1000, 1500, 2000, 2500, and 3300 m/min. The tenacity of the m-iPP fibers (from resin of melt flow rates of 40, 51 and 68, col. 14, line 1, and Table 1, lines 15–33) exceeded that of both a reactor grade Ziegler-Natta isotactic polypropylene (herein, a "Rx ZN-iPP") having a MFR of 35, and a visbroken controlled rheology Ziegler-Natta isotactic polypropylene (herein, a "CR ZN-iPP") having a MFR of 33.

U.S. Pat No. 6,010,588 explains these results, saying of the drawing stress imparted to melt formed fiber, that "as greater force is applied after the fiber is melt-formed, the tenacity of the single-site catalyst produced ployolefin fibers increases markedly. This is easily seen through recognition of the fact that as the take-up rate increased, the fiber diameter decreases and a greater degree of strain is imparted to the fiber. It is apparent that the test example fibers have noticeably higher tenacities at the higher take-up rates than do either of the control examples." The highest tenacity achieved in U.S. Pat. No. 6,010,588 with an m-iPP was with the 40 MFR resin at take up rates of 3300 m/min, giving 4.38 g/den (grams per denier); at the slower draw rate of 1500 m/min, tenacity was less than 3 (i.e. 2.75 g/den). U.S. Pat. No. 6,010,588 indicates that by high speed stretching of m-iPP, one can form smaller diameter, therefore softer, fibers, that have higher tenacity: "This newly discovered trait of fibers formed of reactor-grade, metallocene-type produced polymer therefore offers the ability to form smaller fibers requiring less material, which are softer due to their greater flexibility, and which are stronger, yet still may be produced at higher rates; a tremendous set of advantages for any fiber producer."

In U.S. Pat. No. 6,146,758, a m-iPP was produced in one instance with dimethyl silyl bis(2-methyl indenyl) zirconiom dichloride and was comparison tested with a commercially available m-iPP believed produced with a bridged bis(indenyl) ligand of enantiomorphic configuration. The m-iPP's were melt spun into fibers and compared to fibers melt spun from a Rx ZN-iPP. Spinning was performed at a melt temperature of 230° C. for the Rx ZN-iPP and at 195° C. for the m-iPP polymers. The draw speed was initially at 2000 m/min and increased, in increments of 500 m/min through 4000 m/min while maintaining the draw ratio constant at 3:1. The tenacities of the two m-iPP polymers increased with draw speed (one better than the other) whereas the tenacity of the Rx ZN-iPP decreased with draw speed. The highest m-iPP tenacity was about 4.5 g/denier, achieved at a draw speed of 3000 m/min.

While the tenacities achieved from m-iPP at the high draw speeds exemplified by U.S. Pat. Nos. 6,010,588 and 6,146,758 are impressive, not all fiber processors are able to operate their melt spinning operation at such high draw speeds and draw ratios to obtain fine diameter, high tenacity m-iPP fibers.

Another approach to making fine fibers in order to make soft fabrics having good hand has been to increase the ethylene content of a resin above the limits practically available for liquid and hybrid reactor systems, and make alloys of propylene-ethylene copolymers, as exemplified by U.S. Pat. No. 5,994,482. This patent compares the tenacities obtained with fibers from the patented alloys to tenacities of fibers from melt spun 3% and 5% controlled rheology Ziegler-Natta isotactic propylene-ethylene copolymers (herein, a "CR ZN-iPE RCP") having a MFR of about 33, and shows that the tenacities for the CR ZN-iPE RCP are less than 3.5 grams/denier at a draw speed of 2000 m/min, which is either not much higher or is less than the tenacities achieved with the m-iPP fibers reported in U.S. Pat. No. 6,010,588 (MFR's of 40 and up) and U.S. Pat. No. 6,146,758 at the same draw speeds. The copolymers exemplified in U.S. Pat. No. 5,994,482 are produced using Ziegler-Natta catalysts, but mention is made (col. 10, lines 49–56) that a metallocene catalyst would be another suitable method of making the copolymers, since it would allow the production of a copolymer alloy having a MFR in the range of from about 35 to about 2000 g/10 minutes with a very narrow MWD, eliminating the need for post reactor oxidative degradation of the alloy.

Also taking the alloy or mixture approach are U.S. Pat. Nos. 5,455,305 and 5,874,505. U.S. Pat. No. 5,455,305, discloses a mixture of a syndiotactic propylene homopolymer and an isotactic propylene homopolymer that is melt spun into fibers at a draw ratio of about 3.8:1, and states that a random copolymer of propylene and an α-olefin selected from ethylene and $C_4$–$C_8$ α-olefins may be used instead of the isotactic propylene homopolymer. U.S. Pat. No. 5,874,505 discloses a mixture of 20 to 97 wt.% metallocene produced isotactic polypropylene homopolymer and 5 to 80 wt. % of an α-olefin copolymer produced by a metallocene catalyst and comprising 10 to 90 wt. % of one α-olefin and 90 to 10 wt. % of another α-olefin, exemplifying, however, only propylene-ethylene copolymers, apparently in the only random copolymer exemplified, of 35 mol % of ethylene, assuming copolymerization proportional to feed rates.

Disclosing metallocene catalyzed copolymers of propylene and another α-olefin are U.S. Pat. Nos. 5,959,046, 5,516,866, and 5,763,080. U.S. Pat. No. 5,959,046 discloses a rac-diphenylsilyl-bis{1-(2,7-dimethyl-4-isopropylindenyl)}zirconium dichloride and a rac-dimethylsilyl-bis{1-(2,7-dimethyl-4-isopropylindenyl)}zirconium dichloride catalyzed copolymerization of propylene and ethylene to manufacture propylene ethylene copolymers tested for film and sealant use in which ethylene content ranged from 2.9 mol % to 27 mol %. U.S. Pat. No. 5,516,866 describes crystalline copolymers of propylene with from 2 to 6 mol percent of ethylene or 2 to 10 mol % butene-1, with a low melting point and a limited solubility in xylene at 25° C., prepared using metallocene catalysts obtained from stereorigid and chiral compounds of zirconium, and methylalumoxanic compounds. The suggested use was film; no fibers were made or taught made from these compositions. U.S. Pat. No. 5,763,080 discloses fibers produced from metallocene catalyzed copolymers of propylene and 0.2 to 6 mol percent of $C_5$ and higher α-olefins (in particular, 4-methyl-1-pentene, 1-hexene or 1-octene) and fiber bundles comprising a fiber made from the copolymer and a propylene homopolymer, for use in manufacture of spun bonded and nonwoven fabrics. The copolymer provided a lower melting temperature to facilitate spin bonding the more crystalline isotactic propylene homopolymer.

From the foregoing, it is apparent that the art has emphasized high draw speeds and high draw ratios and use of polymers or copolymers having a MFR 35 or higher for melt spinning formation of fibers to obtain fiber properties having high strength and soft hand. At draw speeds above 2000 and draw ratios around 3 or more, none of the approaches of the prior art addresses the problem of producing high tenacity fibers at low melt spinning draw speeds, much less producing a high tenacity fibers at low processing speeds and making a fiber having soft hand.

SUMMARY OF THE INVENTION

We have invented new elongated fibers and processes for forming them, such fibers being made from metallocene catalyzed isotactic propylene α-olefin random copolymers having a melt flow rate of less than 35, The fibers not only have a soft hand, but rather astonishingly, have a very high tenacity, exceeding even that of a metallocene isotactic propylene homopolymer. We use the abbreviation "m-iPAO RCP" to indicate the copolymers making up the fibers of this invention (the "m" means metallocene catalyzed, the "i" means isotactic, the "P" means propylene, the "AO" means ethylene and the $C_4$–$C_8$ α-olefins, and RCP means random copolymer). When speaking only of a metallocene catalyzed propylene ethylene random copolymer, we use the abbreviation "m-iPE RCP" in which "E" stands for ethylene.

Surprisingly, we have found that m-iPE RCP fibers having these properties of soft hand and high tenacity can be produced at low draw speeds, less than 2000 m/min., and at low draw ratios of about 5 and less, suitably from about 1.5:1 to about 5:1.

The new fibers of this invention are made from m-iPAO RCP copolymers that have melt flow rates less than 35. It is surprising these copolymers are useful for melt spinning to get fibers having a soft hand and high tenacity, for the reason that controlled rheology resins, such as the CR ZN-iPP and CR ZN-iPE RCP resins commonly used for melt spinning fibers, have MFR's of about 35 and higher, yet do not give the desired qualities these new m-iPAO RCP copolymer fibers possess. It is counter-intuitive in melt spinning to use high molecular weight polymers (polymers having low MFR), for the reasons explained above, and expect to get a product having soft hand and high tenacity, yet remarkably, excellent melt spinning results can be obtained with the metallocene catalyzed copolymers we describe, and at low draw rates and draw ratios, contrary to the direction the fiber art is going with metallocene catalyzed propylene homopolymers ("m-iPW").

In accordance with our invention, we provide an elongated fiber product comprising a drawn metallocene catalyzed propylene-ethylene (or other α-olefin with a carbon number range in the $C_4$–$C_8$) random copolymer fiber having a $C_2$, $C_4$, $C_5$, $C_6$, $C_7$ or $C_8$ α-olefin monomer content of from fractional (less than 1), for example about 0.2, to about 10 mol %, preferably 5 mol % or less, more preferably 3 mol % or less, and a MFR of from fractional to less than about 35, suitably about 30 or less, preferably more than 5 (dg/min at 230° C.), and capable of being drawn at a draw speed of less tan 2000 m/min, yet having very high tenacity. The fiber is prepared by spinning and drawing at a draw speed suitably about 1500, suitably less, around 1000 m/min, and a draw ratio within the range of 1.5–5:1 preferably at least 2:1, suitably 3:1) and is further characterized by having a tenacity of about 3.5 grams per denier and higher.

In a further aspect of the invention there is provided a process for the production of m-iPAO RCP fibers. In carrying out the process, there is provided an m-iPAO RCP produced by the polymerization of propylene and a $C_2$, $C_4$, $C_5$, $C_6$, $C_7$ or $C_8$ α-olefin monomer in the presence of a metallocene catalyst system comprising a bridged chiral and stereorigid cyclopentadienyl or substituted cyclopentadienyl ligand structure of a transitional metal selected from group 4b, 5b, or 6b metals of the Periodic Table of Elements and having a MFR less than 35, suitably about 30 or less. The copolymer is heated to a molten state and extruded to form a fiber preform. The preform is subjected to spinning at a spinning speed of at least 300 meters per minutes and subsequent drawing at a speed of up to about 1500 meters per minute to provide a draw ratio of at least 1.5 up to 5, preferably 2 and more preferably 3, to produce a continuous m-iPAO RCP fiber having a tenacity of about 3.5 grams per denier and higher.

In yet a further embodiment of the invention, there is provided a process for the production of propylene-ethylene (or other α-olefin with a carbon number range in the $C_4$–$C_8$) random copolymer fibers in which the draw speed and/or the draw ratio can be varied to produce fibers of different mechanical properties. In this aspect of the invention, there is provided an m-iPAO RCP having a MFR less than about 35 produced by the copolymerization of polypropylene and ethylene (or other α-olefin with a carbon number range in the $C_4$–$C_8$) in the presence of an isospecific metallocene catalyst characterized as having a bridged bis(indenyl) ligand in which the indenyl ligand is an enantiomorphic and may be substituted or unsubstituted. The m-iPAO RCP is heated to a molten state and extruded to produce a fiber preform which is then spun at a spinning speed of at least 300, preferably 500 meters per minute or more and subsequently drawn at a spinning speed of up to about 1,500 meters per minute at a draw ratio of at least 1.5, up to about 5, preferably in the range 2–4, most preferably 3, to provide a continuous fiber of a desired physical characteristic. The process involves continuing to provide an m-iPAO RCP copolymer produced by the copolymerization of polypropylene and ethylene (or other α-olefin with a carbon number range in the $C_4$–$C_8$) in the presence of an isospecific metallocene catalyst and heating the polymer to produce a fiber preform which is subjected to spinning under a spinning speed of at least 300, preferably 500 meters per minute or more and subsequently drawn at a spinning speed of up to about 1,500 meters per minute at a draw ratio of at least 1.5, up to about 5, preferably in the range 2–4, most preferably 3.

BRIEF DESCRIPTION OF THE DRAWINGS

FIG. 3 is a plot of elongation on the ordinate versus draw ratio on the abscissa showing the elongation properties from several m-iPE RCP copolymers prepared by catalysis with metallocene catalyst compared to the results obtained for fibers prepared from an m-iPP polymer, a CR ZN-iPP and a Rx ZN-iPP, and a ZN-iPE RCP.

DETAILED DESCRIPTION OF THE INVENTION

Figure 1:
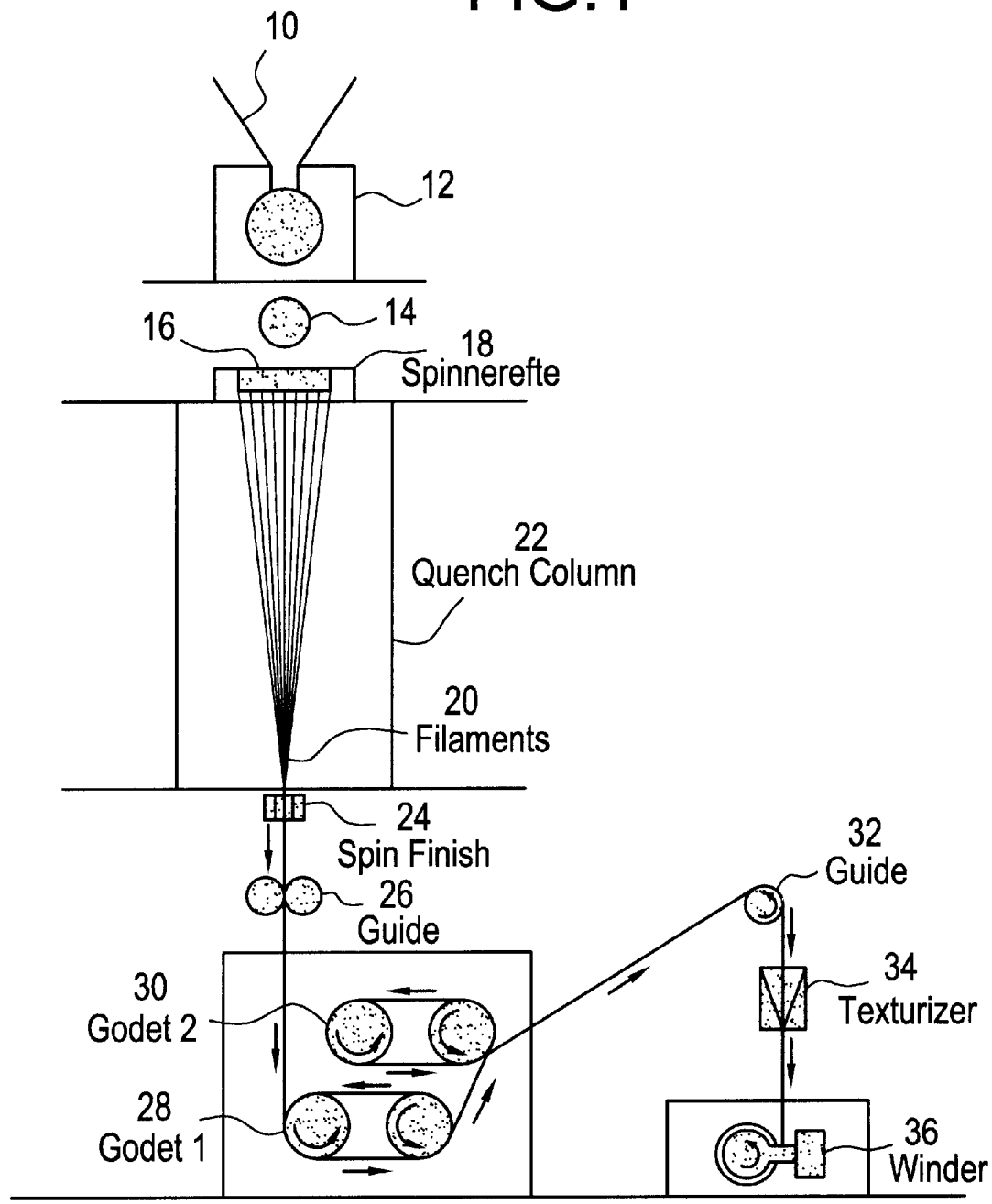
FIG. 1 is a schematic depiction of a prior art melt spinning process.

The random copolymers of our invention are comprised of propylene and one of a $C_2$, $C_4$, $C_5$, $C_6$, $C_7$ or $C_8$ α-olefin monomer. For example, and not by way of limitation, fibers of the present invention are derived from copolymers of propylene and any one of ethylene, 1-butene, 1-pentene, 1-hexene, 4-methyl-1-pentene, 1-octene, 1,3-butadiene, isoprene, octene, styrene, fluorethyl, vinyl chloride. Within this specification, the term "olefin" is meant to encompass dienes and vinyl monomers, such as for example, those listed above. In an embodiment, the random crystalline propylene copolymers of the present invention random, consist essentially of from about 90 to about 99.5 mol % of propylene; preferably about 92 to about 99 mol %, more preferably about 94 to about 98 mol % of propylene; and from about 0.5 to about 10 mol % of at least one comonomer selected from the group consisting of ethylene and $C_4$–$C_8$ α-olefins. When a $C_4$–$C_8$ α-olefin is not present, the copolymer suitably contains from about 0.5 to about 10 mol % ethylene, preferably from about 1 to about 5 mol %, more preferably from about 1.5 to about 3.5 mol %. When a $C_4$–$C_8$ α-olefin is present, the copolymer preferably contains from about 1 to about 8 mol %, more preferably about 2 to about 6 mol % of an olefin selected from the group consisting from $C_4$–$C_8$ α-olefins. The larger the percentage of ethylene or other α-olefin, the greater the draw resonance and softer the feel of the fiber ("hand"). The use of propylene-ethylene copolymers of isotactic structure in accordance with the present invention provides for polymer structures which can be correlated with desired fiber characteristics, such as strength, toughness, and "hand" and in terms of the draw speed and draw ratios employ during the fiber-forming procedure.

The m-iPAO RCP resin for the fibers of our invention is prepared by copolymerization of polypropylene and an ethylene or $C_4$, $C_5$, $C_6$, $C_7$ or $C_8$ α-olefin monomer in the presence of a bridged chiral and stereorigid cyclopentadienyl or substituted cyclopentadienyl ligand of a transition metal of group 4b, 5b, or 6b of the Periodic Table of elements. The catalyst may be more particularly described by the formula:

$$R''(C_5 R'_m)_2 Me Q_p \quad (1)$$

wherein ($C_5 R'_m$) is a cyclopentadienyl or substituted cyclopentadienyl ring; R' is a hydrogen or a hydrocarbyl radical having from 1–20 carbon atoms, each R' may be the same or different; R" is the bridge between the two ($C_5 R'_m$) rings and is an alkylene radical having 1–4 carbon atoms, a silicon-hydrocarbyl radical, a germanium hydrocarbyl radical, an alkyl phosphine, or an alkyl amine; Q is a hydrocarbon radical such as an alkyl, aryl, alkenyl, alkylaryl or arylalkyl radical having 1–20 carbon atoms or is a halogen; Me is a group 4b, 5b or 6b metal as positioned in the Periodic Table of Elements; m is a value from 0 to 4; and p is a value from 0 to 3.

Exemplary hydrocarbyl radicals are methyl, ethyl, propyl, butyl, amyl, isoamyl, hexyl, isobutyl, heptyl, octyl, nonyl, decyl, cetyl, phenyl, and the like. Exemplary alkylene radicals are methylene, ethylene, propylene and the like. Exemplary halogen atoms include chlorine, bromine and iodine with chlorine being preferred.

The preferred transition metals are titanium, zirconium, hafnium and vanadium. Q is preferably a halogen and p is preferably 2. R' is preferably a phenyl or cyclohexyl group such that ($C_5 R'_m$) forms an indenyl radical which optionally may be hydrated. As indicated, other hydrocarbon groups may be added to the cyclopentadienyl rings. The preferred R" bridge components are methylene (—CH$_2$—), ethylene (—C$_2$H$_4$—), an alkyl silicon and a cycloalkyl silicon such as cyclopropyl silicon, among others. The present invention is such that the R" bridge and the R' substituents may be varied among any of those compounds listed in the above formula so as to provide polymer products with different properties.

In a more specific particular, the present invention suitably may be carried out by employing an m-iPAO RCP produced by an isospecific metallocene based upon an indenyl structure which is mono-substituted at the proximal position and otherwise unsubstituted, with the exception that the indenyl group can be hydrogenated at the 4, 5, 6, and 7 positions, in accordance with the following elemental formula:

$$\text{rac-}R_a R_b Si(2-R_c Ind)_2 MeQ_2, \quad (2)$$

in which "rac" means racemic, $R_a$ and $R_b$ are each independently a $C_1$–$C_4$ alkyl group or a phenyl group; Ind is an indenyl group or a hydrogenated indenyl group substituted at the proximal position by the substituent $R_c$ and being otherwise unsubstituted or being substituted at 1 or 2 of the 4, 5, 6, and 7 positions; $R_c$ is a ethyl, methyl, isopropyl, or tertiary butyl group; Me is a transition metal selected from the group consisting of titanium, zirconium, hafnium, and vanadium; and each Q is independently a hydrocarbyl group containing 1 to 4 carbon atoms or a halogen.

Thus, in a particular respecting formula (2), the ligand structure may be characterized by 2-alkyl hydrogenated indenyl as indicated by the following structural formula:

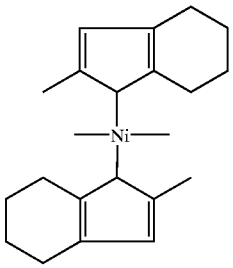

or a racemic silyl-bridged bis(2-alkylindenyl) as indicated by the following structural formula:

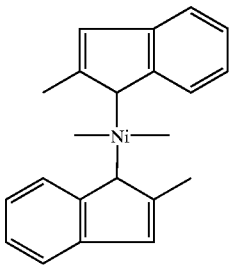

As indicated by Formula (2) above, the silyl bridge can be substituted with various substituents in which $R_a$ and $R_b$ are each independently a methyl group, an ethyl group, a propyl group (including an isopropyl group), and a butyl group (including a tertiary butyl or an isobutyl group). Alternatively, one or both of Ra, Rb" can take the place of a phenyl group. Preferred bridge structures for use in carrying out the present invention are dimethylsilyl, diethylsilyl, and diphenylsilyl structures.

The $R_c$ substituent at the 2 position (the proximal position with regard to the bridge head carbon atom) can be a methyl, ethyl, isopropyl, or tertiary butyl. Preferably, the substituent at the 2 position is a methyl group. As noted previously the indenyl group is otherwise unsubstituted except that it may be a hydrogenated indenyl group. Specifically, the indenyl ligand preferably will take the form of a 2-methyl indenyl or a 2-methyl tetrahydrol indenyl ligand. As will be recognized by those skilled in the art, the ligand structure should be a racemic structure in order to provide the desired enantiomorphic site control mechanism to produce the isotactic polymer configuration.

Mixtures of mono- and poly-substituted indenyl-based metallocenes may be used in producing the polymers used in the present invention. Poly-substituted indenyl-based metallocenes may be employed in conjunction with the mono-substituted indenyl structures shown above. In this case, at least 10% of the metallocene catalyst system should comprise the mono-substituted bis(indenyl) structure. Preferably, at least 25% of the catalyst system comprises the mono-substituted bis(indenyl) metallocene. The remainder of the catalyst system can include polysubstituted indenyl-based metallocenes. Particularly useful di-substituted bis(indenyl) metallocenes which may be used in the present invention include those which are substituted at the 4 position as well as at the 2 position. The substituents at the 2 position on the indenyl group are as previously described with ethyl or methyl being preferred and the latter being especially preferred. The substituents at the 4 positions on the indenyl groups are normally of greater bulk than the alkyl groups substituted at the 2 position and include phenyl, tolyl, as well as relatively bulky secondary and tertiary alkyl groups. Thus, the 4 substituent radicals normally have a high molecular weight than the 2 substituent radicals. Thus, where the 2 substituent is a methyl or ethyl group, the substituents at the 4 position may take the form of isopropyl or tertiary butyl groups as well as aromatic groups. Accordingly, it often will be preferred to employ, in combination with the mono-substituted indenyl groups, such as dimethylsilyl, bis(2-methyl indenyl) zirconium dichloride, a di-substituted metallocene having an aryl group at the 4 position. Particularly preferred in combination with the dimethylsilyl bis(2-methyl indenyl) zirconium dichloride is a corresponding dimethylsilyl bis(2-methyl, 4-phenyl indenyl) zirconium dichloride. Tri-substituted bis(indenyl) compounds may also be employed. Specifically, racemic dimethylsilyl bis(2-methyl, 4,6 diphenyl indenyl) zirconium dichloride may be used in combination with the silyl bis(2-methyl indenyl) derivative.

The propylene copolymers employed in the present invention can be one having a relatively non-uniform melt temperature. While having a high isotacticity is defined in terms of meso pentads and meso diads, the polymers also have irregularities in the polymer structure characterized in terms of 2,1 insertions, as contrasted with the predominant 1,2 insertions characteristic of isotactic polypropylene. Thus, the polymer chain of the isotactic propylene copolymer employed in the present invention are characterized by intermittent head-to-head insertions. Totally apart from incorporation of ethylene monomer when copolymerizing propylene and ethylene, the occasional head-to-head insertion resulting from the use of the 2-alkyl substituted indenyl group results in adjacent pendant methyl groups separated by ethylene groups. Apart from the contribution from copolymerized ethylene, the resulting aforementioned adjacent pendant methyl groups separated by ethylene groups in a polymer structure supplementally behaves somewhat in the fashion of a random ethylene propylene copolymer, and contributes to a variable melting point. This contribution results in a polymer which can be advantageously-employed to produce fibers having good characteristics in terms of mechanical properties and machine operation, including machine speed.

Metallocene catalysts, such as those described above, can be used either as so-called "neutral metallocenes" in which case an organoaluminum compound is used as a co-catalyst, or they can be employed as so-called "cationic metallocenes" which incorporate a stable non-coordinating anion and normally do not require the use of an organoaluminum compound. When used as a neutral as distinguished from a cationic metallocene, the metallocenes are employed in combination with an organoaluminum compound. Preferably, the organoaluminum compound is an alumoxane represented by the general formula (R—Al—O) in the cyclic form and R(R—Al—O—)$_n$ AlR$_2$ in the linear form. In the general formula, R is an alkyl group with 1–5 carbons and n is an integer from 1 to about 20. Most preferably, R is a methyl group. Normally, methylalumoxane will be employed as a co-catalyst, but various other polymeric alumoxanes, such as ethylalumoxane and isobutylalumoxane, may be employed in lieu of or in conjunction with methylalumoxane. The use of such co-catalysts in metallocene-based catalyst systems are well-known in the art, as disclosed, for example, in U.S. Pat. No. 4,975,403, the entire disclosure of which is incorporated herein by reference. So-called alkylaluminum co-catalysts or scavengers are also normally employed in combination with the metallocene alumoxane catalyst systems. Suitable alkylaluminum or alkylaluminum halides include trimethyl aluminum, triethylaluminum (TEAL), triisobutylaluminum (TIBAL), and tri-n-octylaluminum (TNOAL). Mixtures of such co-catalysts may also be employed in carrying out the present invention. While trialkylaluminums will usually be used as scavengers, it is to be recognized that alkylaluminum halides, such as diethylaluminum chloride, diethylaluminum bromide, and dimethylaluminum chloride, or dimethylaluminum bromide, may also be used in the practice of the present invention.

While the metallocene catalysts employed in the present invention can be used as homogeneous catalyst systems, preferably they are used as supported catalysts. Supported catalyst systems are well-known in the art as both conventional Zeigler-Natta and metallocene-type catalysts. Suitable supports for use in supporting metallocene catalysts are disclosed, for example, in U.S. Pat. No. 4,701,432 to Welborn, and include talc, an inorganic oxide, or a resinous support material such as a polyolefin. Specific inorganic oxides include silica and alumina, used alone or in combination with other inorganic oxides such as magnesia, titania, zirconia, and the like. Other support for metallocene catalysts are disclosed in U.S. Pat. No. 5,308,811 to Suga et al and U.S. Pat. No. 5,444,134 to Matsumoto. In both patents the supports are characterized as various high surface area inorganic oxides or clay-like materials. In the patent to Suga et al, the support materials are characterized as clay minerals, ion-exchanged layered compounds, diatomaceous earth, silicates, or zeolites. As explained in Suga, the high surface area support materials should have volumes of pores having a radii of at least 20 angstroms. Specifically disclosed and preferred in Suga are clay and clay minerals such as montmorillonite. The catalyst components in Suga are prepared by mixing the support material, the metallocene, and an organoaluminum compound such as triethylaluminum, triethylaluminum, various alkylaluminum chlorides, alkoxides, or hydrides or an alumoxane such as methylalumoxane, ethylalumoxane, or the like. The three components may be mixed together in any order, or they may be simultaneously contacted. The patent to Matsumoto similarly discloses a supported catalyst in which the support may be provided by inorganic oxide carriers such as SiO$_2$, Al$_2$O$_3$, MgO, ZrO$_2$, TiO$_2$, Fe$_2$O$_3$, B$_2$O$_2$, CaO, ZnO, BaO, ThO$_2$ and mixtures thereof, such as silica alumina, zeolite, ferrite, and glass fibers. Other carriers include MgCl$_2$, Mg(O-Et)$_2$, and polymers such as polystyrene, polyethylene, polypropylene, substituted polystyrene and polyarylate, starches, and carbon. The carriers are described as having a surface area of 50–500 m$^2$/g and a particle size of 20–100 microns. Supports such as those described above may be used. Preferred supports for use in carrying out the present invention include silica, having a surface area of about 300–800 m$^2$/g and a particle size of about 5–10 microns. Where mixtures of metallocenes are employed in formulating the catalyst system, the support may be treated with an organoaluminum co-catalyst, such as TEAL or TIBAL, and then contacted with a hydrocarbon solution of the metallocenes followed by drying steps to remove the solvent to arrive at a dried particulate catalyst system. Alternatively, mixtures of separately supported metallocenes may be employed. Thus, where a mixture of metallocenes are employed, a first metallocene, such as racemic dimethylsilyl bis(2-methyl indenyl) zirconium dichloride, may be supported on a first silica support. The second di-substituted metallocene, such as racemic dimethylsilyl bis(2-methyl, 4-phenyl indenyl) zirconium dichloride, can be supported on a second support. The two quantities of separately supported metallocenes may then be mixed together to form a heterogeneous catalyst mixture which is employed in the polymerization reaction.

The isotacticity of the polymer can be controlled by appropriate selection of the isospecific metallocene. It will be preferred, in carrying out the present invention, to employ a polymer having an isotacticity of at least 90% as determined by the meso pentad of at least 90%. The polymer should have meso diads of at least 95% with a correspondence in racemic diads being 5% or less. Moreover, the polymers preferably have 2,1 insertion errors, as described previously, of about 1% or slightly above. The melt temperature of the polymer increases with the decreasing 2,1 insertions. As a practical matter, it is preferred to employ polymers having 2,1 insertion errors of at least 0.5%.

The use of isospecific metallocene catalysts in accordance with the present invention provides for m-iPAO RCP structures which can be correlated with desired fiber characteristics, such as strength, toughness, and in terms of the draw speed and draw ratios employed during the fiber-forming procedure.

The polymerization procedures useful in the present invention include any procedures known in the art. An example of a preferred procedure would be that disclosed in U.S. Pat. No. 4,767,735, issued Aug. 30, 1988, hereby incorporated by reference which describes a pre-polymerization of the catalyst before introducing the catalyst into a polymerization reaction zone.

About 0.0% to about 4.0% additives may optionally be added. An additive package of various embodiments of the present invention may include stabilizers, ultra-violet screening agents, oxidants, anti-oxidants, anti-static agents, ultraviolet light absorbent, a lubricant, a fire retardant, processing oils, mold release agent, coloring agent, pigments, nucleating agents, fillers, and the like with other components. However, this should not be considered a limitation of the present invention. Additive packages common to various embodiments of this invention are typically suited for whatever particular needs or desires the user or maker needs and various combinations of various formulations and compounds of the aforementioned varieties and others may be used either singularly or in combination.

Suitable examples of various oxidants and anti-oxidants include such compounds, either solely or in combination, and the like as phenol like 2,6-di-t-butyl-p-cresol, butylated hydroxyanisole, 2,6-di-butyl-4-ethylphenol, stearyl-beta.-(3,5-di-t-butyl-4-hydroxyphenyl) propionate, 2,2-methylene bis(4-methyl-6-t-butylphenyl), 2,2-methylene bis(4-ethyl-6-t-butylphenol), 4,4-thio bis(3-methyl-6-t-butylphenol, 4,4-butylidene bis(3-methyl-6-t-butylphenol, tetrakis (methylene-3-(3,5-di-t-butyl-4-hydroxyphenyl)propionate) methane, 1,1,3-tris(2-methyl-4-hydroxy-5-t-butylphenyl) butane, etc., amine compounds such as phenyl-.beta.-napthylamine, N,N-diphenyl-p-phenylenediamine, etc. phosphor compounds such as tris(nonylphenyl) phosphite, triphenyl phosphite, trioctadecyl phosphite, diphenyl isodecyl phosphite, etc., sulfur compounds such as dilaurylthiodipropionate, dimyristylthiodipropionate, distearylthiodipropionate, etc., and the like.

Suitable examples of various anti-static agents include such compounds, either solely or in combination, and the like as polyoxyethylene alkylamines, polyoxyethylene alkylamides, etc., anionic anti-static agents such as alkyl sulfonates, alkyl benzene sulfonates, etc., cationic anti-static agents such as quaternary ammonium chloride, quaternary ammonium sulfate, etc., amphoteric anti-static agents such as alkylbetains, alkylimidazolines, etc.

Suitable examples of various ultraviolet light absorbents include such compounds, either solely or in combination, and the like as salicyclic acid based ultraviolet light absorbents such as phenyl salicylate, etc., benzophenone based ultraviolet absorbents such as 2,4-dihydroxybenzophenone, 2-hydroxy-4-methoxybenzophenone, etc., benzotriazole based ultraviolet light absorbents such as 2-(2-hydroxy-5-methylphenyl)benzotriazole, 2-(2-hydroxy-5-t-butylphenyl)-benzotriazole, etc.

Suitable examples of various lubricants include such compounds, either solely or in combination, and the like as aliphatic hydrocarbons, higher aliphatic alcohols, fatty acid amides, metal soaps, fatty acid esters, etc., and the like.

Suitable examples of various flame retardants include such compounds, either solely or in combination, and the like as halogen containing flame retardants such as polytribromostylene, decabromodiphenyl, decabromo-bisphenol A, etc. phosphor based flame retardants such as ammonium phosphate, tricresyl phosphate, acid phosphate, etc., inorganic flame retardants such as tin oxide, antimony trioxide, etc. and the like.

Suitable examples of various coloring agents include such compounds, either solely or in combination, and the like as are commonly known to be used for coloring for varying types of plastics and the like.

Suitable examples of various mold release agents include such compounds, either solely or in combination, and the like as carnauba wax, paraffin wax, silicone oil, etc. and the like.

Furthermore, various other embodiments of the present invention can contain an elastomer or other inorganic filler as the additive package, either alone or in combination with the aforementioned additives.

The process of melt spinning an m-iPAO RCP resin can be termed as non-isothermal crystallization under elongation. In the commercial production of bulk continuous filament (BCF) fibers, there is an integrated two-step process involving the initial spinning step and the subsequent drawing step. This gives the fibers the required mechanical properties such as tenacity and elongation.

The fibers are formed by any suitable melt spinning procedure in accordance with the present invention that conforms to the description of draw speeds and draw ratios set forth herein for this invention. The Fourne melt spinning procedure is suitably used. A Fourne fiber spinning machine of the type used in the art for melt spinning fibers prepared from Zeigler-Natta catalyzed resins is illustrated in FIG. 1. As shown in FIG. 1, polypropylene particles are passed from a hopper 10 through a heat exchanger 12 where the polymer pellets are heated to a suitable temperature for extrusion, and then through a metering pump 14 (also called a spin pump) through manifold 16 to a spinnerette 18 (also called a spin roll or spin pack). The portion of the machine from hopper 10 through the spinnerette 16 is collectively referred to as an extruder. The fiber preforms or filaments 20 thus formed are cooled in air in quench column 22, then passed through a spin finisher 24 and guide 26. The collected fibers are then applied through one or more godets to a spinning roll, illustrated in this embodiment as rollers 28 (also collectively referred to as Godet 1). These rollers are operated at a selected spinning rate (referred to as the G1 speed). The thus-formed filaments are drawn off the spin roller to the drawing rollers 30 (also collectively referred to as Godet 2) which are operated at a substantially-enhanced speed (the draw speed or G2 speed) in order to produce the drawn fiber. The draw speed is operated relative to the spinning godet to provide the desired draw ratio (which is the ratio of draw speed to spinning speed). The spun and drawn fiber is optionally passed by guide 32 through a texturizer 34 and then wound up by a winder 36. While the illustrated embodiment and description encompasses the spinning and drawing of a fully oriented yarn, the same equipment may also be used to make a partially oriented yarn. In that instance the drawing step is left out, leaving only the act of spinning the yarn out of the extruder. This step is often accomplished by connecting winder 36 following spin finisher 24 and involves bypassing drawing rollers 30. The force of winding/spinning the yarn off of the extruder results in some stress and elongation, partially orienting the yarn, but does not provide the full benefits of a complete drawing process. For a further description of suitable fiber-spinning procedures for use in the present invention, reference is made to the U.S. Pat. No. 5,272,003, the entire disclosure of which is incorporated herein.

In accordance with the present invention, the m-iPAO RCP is passed from a hopper through a heat exchanger where the m-iPAO RCP pellets are heated to a suitable temperature for extrusion, about 180–280° C., and then through a metering pump to a spin extruder. The fiber preforms thus formed are cooled in air then applied through one or more godets to a spinning roll which is operated at a desired spinning rate, about 300–500 meters per minute, in the present invention. The thus-formed filaments are drawn off the spin roll to the drawing roller which is operated at a substantially-enhanced speed in order to produce the drawn fiber. The draw speed normally will range from about 1000–1500 meters per minute and is opened relative to the spinning godet to provide a desired draw ratio within the range of 1.5:1 to 5:1, suitably less than 3, preferably from 2 to 2.5, using the m-iPAO RCP resins encompassed by this invention having a M less than 35.

In experimental work respecting the invention, fibers were formed with three metallocene catalyzed propylene-ethylene random copolymers (m-iPE RCP), one m-iPP polymer produced by metallocene catalysis, and three polymers produced by catalysis with a supported Ziegler-Natta catalyst. Two of the Zeigler-Natta polymers were polypropylene homopolymers, one of which was a reactor grade polymer (Rx ZN-iPP) and one of which was a controlled rheology polymer (CR ZN-iPP). One of the Ziegler-Natta polymers was an propylene-ethylene mini-random copolymer (hereinafter abbreviated "ZN-iPE RCP" and called a "mini" random copolymer because it contains a fractional amount of ethylene). The m-iPE RCP polymers and the m-iPP polymer were prepared by catalysis with an isospecific metallocene based upon an bridged chiral and stereorigid indenyl ligand structure of the type described above. The Ziegler-Natta resins (Rx ZN-iPP, CR ZN-iPP and ZN-RCP) which were used as controls for comparison were obtained from ATOFINA PETROCHEMICAL COMPANY and are generally available with various MFR's. Two of the m-iPE RCP had a similar MFR of about 8; one of them had an ethylene content of 3.5 mol %, the other an ethylene content of 2.8 mol %. The Rx ZN-iPP had a MFR similar to these latter two m-iPE RCP polymers. One m-iPE RCP copolymer, the m-iPP polymer, and two of the Ziegler-Natta polymers, the CR ZN-iPP polymer and ZN-iPE RCP, had MFR's of about 15. Further specifics about the polymers are set forth in Table 1. The polymers all contained the same anti-oxidant additive package in the composition percentages shown at less than 1 wt. %. The percentages of ethylene in the metallocene produced m-iPE RCP were determined by the better measuring NMR techniques, which gives somewhat higher results than gravimetric techniques used in normal plant quality control testing.

TABLE 1

Description of Isotactic Polymers Tested

| Description | 1.9% $C_2$ = ~15 mf m-iPE RCP | 2.8% $C_2$ = ~8 mf m-iPE RCP | 3.5% $C_2$ = ~8 mf m-iPE RCP | ~15 mf m-iPP | ~15 mf CR ZN-iPP | 0.6% $C_2$ = ~15 mf ZN-iPE RCP | ~8 mf Rx ZN-iPP |
|---|---|---|---|---|---|---|---|
| MFR | 14.5 | 7.7 | 7 | 14.6 | ~5, CR → to 15.3 | ~2.4, CR → to 14 | 7.1 |
| Ethylene mol % (NMR) | 1.9 | 2.8 | 3.5 | | | | |
| Ethylene mol % (QC) | 1.2 | 1.9 | 2.5 | | | 0.6 | |
| DSC on pellets: | | | | | | | |
| Recryst, ° C. | 93.6 | 87.6 | 81.6 | 103 | | | |
| dH, recrystal [J/g] | −75.6 | −72.2 | −61.6 | −88 | | | |
| $2^{nd}$ melt, ° C. | 136.7 | 131 | 125 | 152 | 134 | ~154 | 134 |
| dH, $2^{nd}$ melt [J/g] | 93.7 | 60.7 | 94.4 | 89 | | | |
| GPC | | | | | | | |
| $M_n$ | | | | 7.17E+04 | | | |
| $M_w$ | | | | 1.88E+05 | | | |
| $M_z$ | | | | 3.56E+05 | | | |
| D | | | | 2.60E+00 | | | |
| Antioxidant % w: | | | | | | | |
| CaSt | 0.048 | 0.039 | 0.044 | 0.04 | 0.044 | 0.044 | 0.044 |
| Package 1 | 0.032 | 0.031 | 0.026 | 0.03 | 0.026 | 0.026 | 0.026 |
| Package 2 | 0.088 | 0.072 | 0.089 | 0.07 | 0.089 | 0.089 | 0.089 |

The six polymers were subjected to low speed spinning and drawing. The three m-iPE RCP polymers, the one m-iPP polymer, and the two Ziegler-Natta-based polymers were used to prepare melt spun yarns on a Fourne fiber spinning machine. The fibers formed were studied to confirm the capability of the m-iPAO RCP polymers to perform at a higher level at lower spin rates relative to m-iPP and ZN-iPP polymers.

The melt spinning and drawing operations were carried out using a Fourne melt spinning line at an extruder profile of 200/205/210/215/220° C. Quench conditions were 0.5 mbar at 7.2° C. (45° F.), with two circular spinnerettes, 0.6 mm diameter by 1.2 length/diameter ratio. Spinning was performed at a melt temperature of 195° C. except for the sample based on the Rx ZN-iPP, which was spun at a 230° C. melt temperature because of onset of draw resonance from the lower MFR. Final winder speed was held constant at 1000 m/min. The first duo of godets (G1-G2) was adjusted to effect a change in draw ratio. Samples were collected at a constant linear density of 5 deniers per fiber (dpf) by varying the spin pump speed and winder speed accordingly. The fiber bundle, expressed as total denier, was determined. The fiber bundle tenacity (g/denier) and elongation were measured by pulling to break on an Instron. Fiber testing was performed on an Instron machine. The results of the testing are set forth in Table 2.

TABLE 2

Physical Properties and Spin Data

| | Metallocene Resins | | | | Zeigler-Natta Resins | | |
|---|---|---|---|---|---|---|---|
| Draw Ratio | 1.9% $C_2$ = 15 mg m-iPE RCP | 2.8% $C_2$ = 8 mf m-iPE RCP | 3.5% $C_2$ = 8 mf m-iPE RCP | 14 mf m-iPP | ~15 mf CR ZN-iPP | 0.6% $C_2$ = ~15 mf ZN-iPE RCP | ~8 mf Rx ZN-iPP |
| *Tenacity @ max (grams/denier)* | | | | | | | |
| 1 | 3.1 | 3.1 | 3 | 3.1 | 2.8 | 3.0 | 2.1 |
| 1.5 | 3.7 | 4.3 | 4.2 | 3.4 | 3.6 | | 3.2 |
| 1.6 | | | | | | | |
| 2 | 4 | | 4.9 | 3.8 | 4.1 | | |
| 2.1 | | 4.8 | | | | | |
| 2.3 | | | 5.6 | | | | |
| 2.5 | 4.3 | | | | 4.1 | | |
| 3 | 4.1 | | | 4.3 | | 4.0 | |
| *Tenacity @ break (grams/denier)* | | | | | | | |
| 1 | 2.8 | 2.8 | 2.7 | 2.8 | 2.5 | | 1.9 |
| 1.5 | 3.3 | 3.9 | 3.7 | 3.1 | 3.2 | | 2.9 |
| 1.6 | | | | | | | |
| 2 | 3.6 | | 4.5 | 3.4 | 3.7 | | |
| 2.1 | | 4.3 | | | | | |
| 2.3 | | | 5.1 | | | | |
| 2.5 | 3.9 | | | | 3.7 | | |
| 3 | 3.7 | | | 3.9 | | | |
| *Tenacity @ 5% (grams/denier)* | | | | | | | |
| 1 | 0.5 | 0.6 | 0.6 | 0.5 | 0.5 | | 0.5 |
| 1.5 | 0.9 | 1.0 | 0.9 | 0.8 | 0.8 | | 0.5 |
| 1.6 | | | | | | | |
| 2 | 1.2 | | 1.0 | 1.0 | 0.8 | | |
| 2.1 | | 1.1 | 1.1 | | | | |
| 2.3 | | | | | | | |
| 2.5 | 1.4 | | | | 0.8 | | |
| 3 | 1.3 | | | 1.7 | | | |
| *Modulus @ 5% Elongation (grams/denier)* | | | | | | | |
| 1 | 3.2 | 6.4 | 5.9 | 3.6 | 7.5 | | 7.0 |
| 1.5 | 11.8 | 16.5 | 15.5 | 7.3 | 13.7 | | 8.8 |
| 1.6 | | | | | | | |
| 2 | 15.8 | | 17.5 | 11.3 | 15.6 | | |
| 2.1 | | 18.6 | | | | | |
| 2.3 | | | 20.6 | | | | |
| 2.5 | 22.1 | | | | 15.7 | | |
| 3 | 23.1 | | | 22.8 | | | |
| *% Elongation @ Max (grams/denier)* | | | | | | | |
| 1 | 186.0 | 176.0 | 178.0 | 209.0 | 186.0 | | 249.0 |
| 1.5 | 116.0 | 89.0 | 85.0 | 139.0 | 99.0 | | 160.0 |
| 1.6 | | | | | | | |
| 2 | 75.0 | | 44.0 | 100.0 | 73.0 | | |
| 2.1 | | 41.0 | | | | | |
| 2.3 | | | 44.0 | | | | |
| 2.5 | 54.0 | | | | 49.0 | | |
| 3 | 34.0 | | | 53.0 | | | |
| *% Elongation @ break (grams/denier)* | | | | | | | |
| 1 | 195.0 | 183.0 | 188.0 | 221.0 | 193.0 | | 260.0 |
| 1.5 | 122.0 | 92.0 | 90.0 | 152.0 | 106.0 | | 171.0 |
| 1.6 | | | | | | | |

TABLE 2-continued

Physical Properties and Spin Data

| | Metallocene Resins | | | | Zeigler-Natta Resins | | |
|---|---|---|---|---|---|---|---|
| Draw Ratio | 1.9% $C_2$ = 15 mg m-iPE RCP | 2.8% $C_2$ = 8 mf m-iPE RCP | 3.5% $C_2$ = 8 mf m-iPE RCP | 14 mf m-iPP | ~15 mf CR ZN-iPP | 0.6% $C_2$ = ~15 mf ZN-iPE RCP | ~8 mf Rx ZN-iPP |
| 2 | 83.0 | | 51.0 | 113.0 | 79.0 | | |
| 2.1 | | 47.0 | | | | | |
| 2.3 | | | 49.0 | | | | |
| 2.5 | 62.0 | | | | 55.0 | | |
| 3 | 42.0 | | | 66.0 | | | |

Denier

| 1 | 243 | 257 | 248 | 239 | 239 | 251 | 254 |
|---|---|---|---|---|---|---|---|
| 1.5 | 249 | 264 | 260 | 242 | 250 | 248 | 257 |
| 1.6 | | | | | | | |
| 2 | 253 | | 253 | 263 | 256 | 250 | |
| 2.1 | | 260 | | | | | |
| 2.3 | | | 252 | | | | |
| 2.5 | 255 | | | | 264 | 250 | |
| 3 | 260 | | | 258 | | 247 | |

Spin Tension before G1, g

| 1 | 29 | 35 | 40 | | 30 | 33 | |
|---|---|---|---|---|---|---|---|
| 1.5 | 26 | 35 | 33 | | 26 | 29 | 37 |
| 1.6 | | | | | | | |
| 2 | 25 | | 31 | 25 | 24 | 25 | |
| 2.1 | | 32 | | | | | |
| 2.3 | | | 30 | | | | |
| 2.5 | 23 | | | | 23 | | |
| 3 | 22 | | | 23 | | 24 | |
| 3.6 | | | | | | 22 | |

Draw Tension (G1–G2), g

| 1 | 33 | 30 | 38 | | 46 | 44 | |
|---|---|---|---|---|---|---|---|
| 1.5 | 175 | 250 | 270 | | 185 | 170 | 255 |
| 1.6 | | | | | | | |
| 2 | 230 | | 450 | 180 | 300 | 200 | |
| 2.1 | | 420 | | | | | |
| 2.3 | | | 555 | | | | |
| 2.5 | 360 | | | | 425 | | |
| 3 | 440 | | | 340 | | 410 | |
| 3.6 | | | | | | 500 | |

Winding Tension (G2–G3), g

| 1 | 22 | 33 | 35 | | 34 | 37 | |
|---|---|---|---|---|---|---|---|
| 1.5 | 110 | 195 | 215 | | 140 | 125 | 200 |
| 1.6 | | | | | | | |
| 2 | 160 | | 380 | 125 | 240 | 130 | |
| 2.1 | | 370 | | | | | |
| 2.3 | | | 515 | | | | |
| 2.5 | 300 | | | | 340 | | |
| 3 | 420 | | | 270 | | 360 | |
| 3.6 | | | | | | 500 | |

Ratio of Draw Tension to Spin Tension

| 1 | 1.14 | 0.86 | 0.95 | | 1.53 | 1.33 | |
|---|---|---|---|---|---|---|---|
| 1.5 | 6.73 | 7.14 | 8.18 | | 7.12 | 5.86 | 6.89 |
| 1.6 | | | | | | | |
| 2 | 9.20 | | 14.52 | 7.20 | 12.50 | 8.00 | |
| 2.1 | | 13.13 | | | | | |
| 2.3 | | | 18.50 | | | | |
| 2.5 | 15.65 | | | | 18.48 | | |
| 3 | 20.00 | | | 14.78 | | 17.08 | |
| 3.6 | | | | | | 22.73 | |

Ratio of Winding Tension (G2–G3) to Draw Tension (G1–G2)

| 1 | 0.67 | 1.10 | 0.92 | | 0.74 | 0.84 | |
|---|---|---|---|---|---|---|---|
| 1.5 | 0.63 | 0.78 | 0.80 | | 0.76 | 0.74 | 0.78 |
| 1.6 | | | | | | | |
| 2 | 0.70 | | | | 0.80 | 0.65 | |
| 2.1 | | 0.88 | | | | | |
| 2.3 | | | | | | | |
| 2.5 | 0.83 | | | | 0.80 | | |
| 3 | 0.95 | | | | | 0.88 | |
| 3.6 | | | | | | 1.00 | |

TABLE 2-continued

Physical Properties and Spin Data

| | Metallocene Resins | | | | Zeigler-Natta Resins | |
|---|---|---|---|---|---|---|
| Draw Ratio | 1.9% C₂ = 15 mg m-iPE RCP | 2.8% C₂ = 8 mf m-iPE RCP | 3.5% C₂ = 8 mf m-iPE RCP | 14 mf m-iPP | ~15 mf CR ZN-iPP | 0.6% C₂ = ~15 mf ZN-iPE RCP | ~8 mf Rx ZN-iPP |

G1–G2 Draw Speed as Ratio of Constant 1000 m/min Winder Speed to Ratio of Winding Tension (G2–G3) to Draw Tension (G1–G2)

| Draw Ratio | m-iPE RCP (1.9%) | m-iPE RCP (2.8%) | m-iPE RCP (3.5%) | m-iPP | CR ZN-iPP | ZN-iPE RCP | Rx ZN-iPP |
|---|---|---|---|---|---|---|---|
| 1 | 1500 | 909 | 1086 | | 1353 | 1189 | |
| 1.5 | 1591 | 1282 | 1256 | | 1321 | 1360 | 1275 |
| 1.6 | | | | | | | |
| 2 | 1438 | | | | 1250 | 1538 | |
| 2.1 | | 1135 | | | | | |
| 2.3 | | | | | | | |
| 2.5 | 1200 | | | | 1250 | 1139 | |
| 3 | 1048 | | | | | 1000 | |
| 3.6 | | | | | | | |

Figure 2:
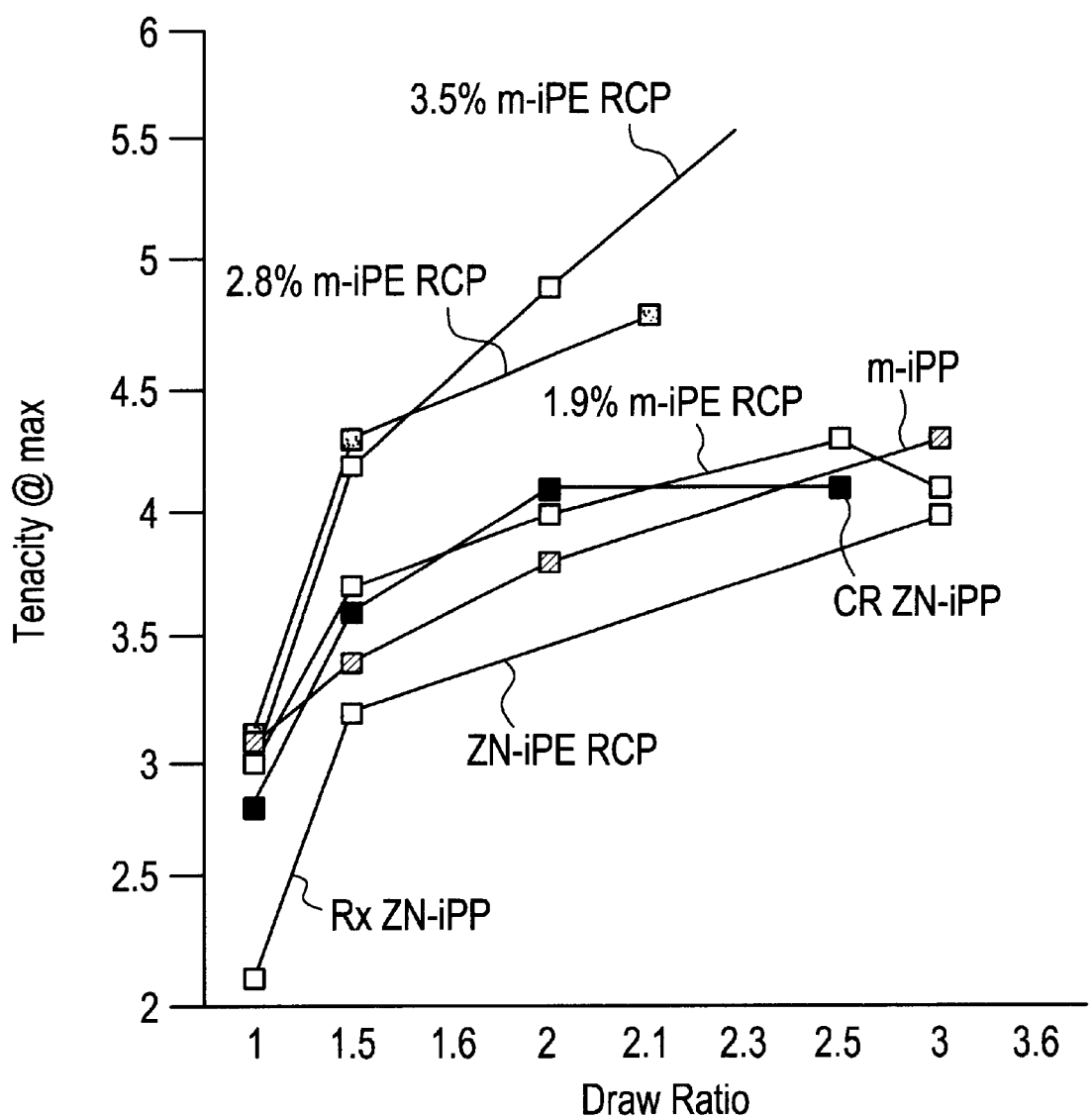
FIG. 2 is a plot of tenacity on the ordinate versus draw ratio on the abscissa showing the tenacity properties from several m-iPE RCP copolymers prepared by catalysis with metallocene catalyst compared to the results obtained for fibers prepared from an m-iPP polymer, a CR ZN-iPP and a Rx ZN-iPP, and a ZN-iPE RCP.

As can be seen from these results and the graphic presentation of these results, which FIGS. 2 and 3, it is apparent that the fibers formed of the metallocene catalyzed ethylene-propylene copolymers (members of the class m-iPAO RCP) handily out-performed both the metallocene catalyzed polypropylene homopolymer fibers and the Zeigler Natta catalyzed fibers made from reactor grade polypropylene (Rx ZN-iPP), controlled rheology polypropylene (CR ZN-iPP) and mini-random propylene-ethylene copolymer (ZN-iPE RCP) resins against which they were tested regarding tenacity, and they compared will regarding elongation. Remarkable tenacity results were achieved: at similar MFR's of about 8, the 2.8 mol % and 3.5 mol % m-iPE RCP fibers-produced at a low 1.5 draw ratio-gave at least a one g/den more strength than the Rx-ZN-iPP fibers, which topped out at 3.2 g/den. The m-iPE RCP fibers continued their climb to tenacity levels approaching or exceeding 5 g/den at draw ratio levels which were less than even 2.5. At similar Mfr's of about 15, the 1.9 mol % m-iPE RCP fibers exceeded or approximated the tenacity performance of the CR ZN-iPP fibers at low draw ratios at or below 2 (where the CR ZN-iPP fibers peaked), yet the m-iPE RCP fibers continued to improve, giving higher tenacities up to a draw ratio of 2.5 (where they peaked). At these similar MFR's of about 15, the 1.9 mol % m-iPE RCP fibers exceeded the performance of the m-iPP fibers at draw ratios from 1.5 to 2.5 or less. The about 8 MFR m-iPE RCP fibers substantially outperformed all the fibers tested. Among the two m-iPE RCP resins, the resin having the greater percentage of ethylene produced the higher tenacities at all draw ratios. The m-iPE RCP resins having the lower MFR (higher MW) produced the greatest tenacities, and they had the larger percentages of ethylene. Further, they achieved tenacities at their lower draw ratio of 1.5 that exceeded the best tenacity of the m-iPP, which was achieved only when it was drawn at a ratio twice as much, at 3.0; plus, the tenacities of these m-iPE RCP resins increased as their draw ratios were increased above 1.5.

For fiber elongation (FIG. 3), it is apparent that m-iPE RCP fibers, after melt spinning, will retain less elongation but form generally stronger fibers, at a given take-up rate, which relates to final fiber diameter, than will the control fibers made from the conventionally catalyzed Rx ZN-iPP and CR ZN-iPP resins.

From the foregoing description, it will be recognized that the fiber-forming operation can be modified in terms of the m-iPAO RCP and their polymerization catalyst and in terms of the fiber spinning parameters to produce fibers of desired physical characteristics during one mode of operation and of another desired physical characteristic or characteristics during another mode of operation. Parameters which can be varied include draw speed and spin speed over desired ranges less than about 2000 while maintaining the draw ratio constant or varying the draw ratio in order to impact parameters such as percent elongation and toughness. Similarly, in the course of the fiber spinning operation, a change may be made from one m-iPAO RCP to another (distinguishable in terms of the α-olefin copolymerized with propylene and the metallocene catalyst used in the copolymerization) to impact such physical parameters of the fibers while maintaining the draw speed and/or the draw ratio constant or while varying these fiber spinning parameters, as well as the copolymers supplied to the fiber spinning system.

Having described specific embodiments of the present invention, it will be understood that modifications thereof may be suggested to those skilled in the art, and it is intended to cover all such modifications as fall within the scope of the appended claims.

What is claimed is:

1. An elongated fiber product comprising a drawn isotactic random copolymer of propylene and at least one α-olefin selected from the group consisting of ethylene, $C_4$–$C_8$ α-olefins, 1,3 butadiene, isoprene, styrene, fluoroethylene, and vinyl chloride, wherein said α-olefin is present in said copolymer in the range of from about 0.2 to about 10 mole percent based on the total moles of propylene and said α-olefin in said copolymer, said copolymer having a MFR less than 35 dg/min at 230° C., said copolymer being copolymerize in the presence of a catalyst system comprising a bridged chiral and stereorigid cyclopentadienyl or substituted cyclopentadienyl ligand structure of a transitional metal selected from group 4b, 5b, and 6b metals of the Periodic Table of Elements, said elongated fiber being prepared by drawing a melt spun preform at a draw speed of less than 2000 meters per minute and a draw ratio of at least 1.5:1 and further characterized by having a tenacity of about 3.5 grams per denier and greater.

2. The elongated fiber product of claim 1 wherein said copolymer comprises a monomer selected from the group consisting of ethylene, 1-butene, 4-methyl-1-pentene, 1-hexene, and 1-octene.

3. The fiber product of claim 1 wherein said α-olefin is present in the range of from about 0.2 to about 6 mole percent based on the total moles of monomer in said copolymer.

4. The fiber product of claim 3 wherein said α-olefin is ethylene and is present in said copolymer in the range of from about 0.2 to about 5 mole percent based on the total moles of monomer in said copolymer.

5. The elongated fiber product of claim 4 in which the MFR of the copolymer is from about 5 to about 30 dg/min at 230° C.

6. The elongated fiber product of claim 5 in which the draw speed is from about 1000 to about 1500 meters per minute.

7. The elongated fiber product of claim 5 in which said draw ratio is in the range from 1.5:1 to about 5:1.

8. The elongated fiber product of claim 5 in which the MFR is from about 8 to about 15 dg/min at 230° C.

9. The elongated fiber product of claim 8 in which the draw speed is from about 1000 to about 1500 meters per minute.

10. The elongated fiber product of claim 9 in which said draw ratio is in the range from 1.5:1 to about 5:1.

11. The elongated fiber product of claim 8 in which the draw speed is about 1000 m/min, and the draw ratio is from about 2 to about 2.5.

12. The elongated fiber product of claim 1 in which said catalyst system comprises a component described by the formula $R''(C_5R'_m)_2Me\ Q_p$, wherein $(C_5R'_m)$ is a cyclopentadienyl or substituted cyclopentadienyl ring; each R' is the same or different and is a hydrogen or hydrocarbyl radical having 1–20 carbon atoms; R" is a structural bridge between the two $(C_5R'_m)$ rings imparting stereo-rigidity to said catalyst, and R" is selected from the group consisting of an alkylene radical having 1–4 carbon atoms, a silicon hydrocarbyl radical a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal as designated in the Periodic Table of Elements; each Q is independently a hydrocarbyl radical having 1–20 carbon atoms or a halogen; m is a value from 0 to 4; and p is less than or equal to 3.

13. The elongate fiber product of claim 12 in which in the catalyst system R' is selected such that the group $(C_5R'_m)$ is an indenyl radical or a hydrogenated indenyl radical.

14. The elongated fiber product of claim 12 in which in the catalyst system Me is hafnium, zirconium, titanium or vanadium.

15. The elongated fiber product of claim 12 in which in said catalyst system R" is a silicon hydracarbyl radical and wherein the catalyst is further described by the formula rac-$R_aR_bSi(2-R_cInd)_2MeQ_2$, in which $R_a$ and $R_b$ are each independently a $C_1$–$C_4$ alkyl group or a phenyl group; Ind is an indenyl group or a hydrogenated indenyl group substituted at the proximal position by the substituent $R_c$ and being otherwise unsubstituted or being substituted at 1 or 2 of the 4, 5, 6, and 7 positions; $R_c$ is a ethyl, methyl, isopropyl, or tertiary butyl group; Me is a transition metal selected from the group consisting of titanium, zirconium, hafnium, and vanadium; and each Q is independently a hydrocarbyl group containing 1 to 4 carbon atoms or a halogen.

16. The elongated fiber product of claim 1 in which said catalyst system further comprising an organoaluminum compound selected from the group consisting of alumoxane, trimethyl aluminum, and mixtures thereof.

17. The elongated fiber product of claim 12 in which said catalyst system further comprising an organoaluminum compound selected from the group consisting of alumoxane, trimethyl aluminum, and mixtures thereof.

18. The elongated fiber product of claim 15 in which said catalyst system further comprising an organoaluminum compound selected from the group consisting of alumoxane, trimethyl aluminum, and mixtures thereof.

19. A process of producing an elongated fiber of an isotactic random copolymer of propylene and at least one α-olefin selected from the group consisting of ethylene, $C_4$–$C_8$ α-olefins, 1,3 butadiene, isoprene, styrene, fluoroethylene, and vinyl chloride, wherein said α-olefin is present in said copolymer in the range of from about 0.2 to about 10 mole percent based on the total moles of propylene and said α-olefin in said copolymer, said copolymer having a MFR less than 35 dg/min at 230° C., said copolymer being copolymerized in the presence of a catalyst system comprising a bridged chiral and stereorigid cyclopentadienyl or substituted cyclopentadienyl ligand structure of a transitional metal selected from group 4b, 5b, or 6b metals of the Periodic Table of Elements, comprising:

(E) heating said copolymer to a molten state;
(F) extruding said molten copolymer to produce a fiber preform;
(G) melt spinning said fiber preform at a speed of from about 300 up to about 500 meters per minute to form a fiber;
(H) drawing said fiber at a speed sufficient to provide a draw ratio of from about 1.5:1 to about 5:1 to provide a drawn fiber having a tenacity of about 3.5 grams per 4 denier and greater.

20. The process of claim 19 wherein said copolymer comprises a monomer selected from the group consisting of ethylene, 1 -butene, 4-methyl-1-pentene, 1-hexene, and 1-octene.

21. The process of claim 19 wherein said α-olefin is present in the range of from about 0.2 to about 6 mole percent based on the total moles of monomer in said copolymer.

22. The process of claim 21 wherein said α-olefin is ethylene and is present in said copolymer in the range of from about 0.2 to about 5 mole percent based on the total moles of monomer in said copolymer.

23. The process of claim 22 in which the MFR of the copolymer is from about 5 to about 30 dg/min at 230° C.

24. The process of claim 23 in which the draw speed is from about 1000 to about 1500 meters per minute.

25. The process of claim 23 in which said draw ratio is in the range from 2:1 to 4:1.

26. The process of claim 23 in which the MFR is from about 8 to about 15 dg/min at 230° C.

27. The process of claim 26 in which the draw speed is from about 1000 to about 1500 meters per minute.

28. The process of clam 27 in which said draw ratio is in the range from 1.5:1 to 2.5:1.

29. The process of claim 23 in which the draw speed is about 1000 m/min, and the draw ratio is from about 2 to about 2.5.

30. The process of claim 19 in which said catalyst system comprises a component described by the formula $R''(C_5R'_m)_2Me\ Q_p$, wherein $(C_5R'_m)$ is a cyclopentadienyl or substituted cyclopentadienyl ring; each R' is the same or different and is a hydrogen or hydrocarbyl radical having 1–20 carbon atoms; R" is a structural bridge between the two $(C_5R'_m)$ rings imparting stereo-rigidity to said catalyst, and R" is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal as designated in the Periodic Table of Elements; each Q is independently a hydrocarbyl radical having 1–20 carbon atoms or a halogen; m is a value from 0 to 4; and p is less than or equal to 3.

31. The process of claim 30 in which in the catalyst system R' is selected such that the group ($C_5R'_m$) is an indenyl radical or a hydrogenated indenyl radical.

32. The process of claim 30 in which in the catalyst system Me is hafnium, zirconium, titanium or vanadium.

33. The process of claim 30 in which in said catalyst system R" is a silicon hydracarbyl radical and wherein the catalyst is further described by the formula rac-$R_aR_bSi(2-R_cInd)_2MeQ_2$, in which $R_a$ and $R_b$ are each independently a $C_1$–$C_4$ alkyl group or a phenyl group; Ind is an indenyl group or a hydrogenated indenyl group substituted at the proximal position by the substituent $R_c$ and being otherwise unsubstituted or being substituted at 1 or 2 of the 4, 5, 6, and 7 positions; $R_c$ is a ethyl, methyl, isopropyl, or tertiary butyl group; Me is a transition metal selected from the group consisting of titanium, zirconium, hafnium, and vanadium; and each Q is independently a hydrocarbyl group containing 1 to 4 carbon atoms or a halogen.

34. The process of claim 19 in which said catalyst system further comprising an organoaluminum compound selected from the group consisting of alumoxane, trimethyl aluminum, and mixtures thereof.

35. The process of claim 30 in which said catalyst system further comprising an organoaluminum compound selected from the group consisting of alumoxane, trimethyl aluminum, and mixtures thereof.

36. The process of claim 33 in which said catalyst system further comprising an organoaluminum compound selected from the group consisting of alumoxane, trimethyl aluminum, and mixtures thereof.

* * * * *